Nov. 11, 1924.

R. W. REECE

CARD GAME

Filed Nov. 2, 1921   2 Sheets-Sheet 1

Fig. 1
ASSETS

*Assets Collectible From Winner*

| TAX |
|---|
| THE WINNER OF THE BANK WILL PAY ME    1000 |

*Assets Collectible From Bank*

| ACCIDENT INSURANCE |
|---|
| DRAW FROM BANK 1000 |
| DISCARD WHEN PAID |

*Assets Collectible From Holder Companion Card + Obligation To Bank*

| JUDGEMENT |
|---|
| BY ORDER OF COURT COLLECT FROM HOLDER OF COMPANION CARD   1000 |
| PAY BANK   100 |
| DISCARD WHEN PAID |

*Assets Collectible From Other Players*

| BIRTHDAY |
|---|
| EACH PLAYER PRESENTS YOU WITH   100 |
| DRAW FROM BANK   500 |
| DISCARD WHEN PAID |

Fig. 2
CONDITIONAL ASSETS

*Simple Conditional Asset*

| MISCELLANEOUS ASSETS |
|---|
| SAVINGS ACCOUNT   400 |
| POSTAL SAVINGS   250 |
| COMMERCIAL ACCT.   350 |
|                    1000 |
| HOLD 1,000 ASSET |

*Conditional Asset With Obligation To Pay Bank or Player*

| STOCK |
|---|
| U.S. RUBBER   15,000 |
| PAY BANK   500 |
| HOLD 15,000 ASSET |

*Conditional + Unconditional Asset*

| MORTGAGES |
|---|
| VALUED AT   15,000 |
| DRAW FROM BANK AS INTEREST   500 |
| HOLD 15,000 ASSET |

*Conditional Asset Obligation To Bank + Asset Collectible From Holder of Companion Card*

| HOUSE |
|---|
| VALUED AT   10,000 |
| PAY BANK   300 |
| COLLECT FROM RENTER   400 |
| HOLD 10,000 ASSET |

INVENTOR.

ROBERT W. REECE

BY

ATTORNEY.

Nov. 11, 1924.  
R. W. REECE  
CARD GAME  
Filed Nov. 2, 1921  
1,515,170  
2 Sheets-Sheet 2

Fig. 5 LIABILITIES

SIMPLE LIABILITY TO BANK
- BROKEN ENGAGEMENT — PAY BANK 500 — THIS IS WHAT I LOST BY FORGETTING — DISCARD WHEN PAID

SIMPLE LIABILITY TO PLAYERS
- CHRISTMAS GIFT — TO MY BUSINESS ASSOCIATES PAY EACH PLAYER 200 — DISCARD WHEN PAID

LIABILITY TO HOLDER OF COMPANION CARD
- DEBT — PAY HOLDER OF JUDGEMENT CARD 1,000 — DISCARD WHEN PAID

Fig. 4 UNLIQUIDATED LIABILITIES

- UNBONDED CASHIER DEFAULTS — You AS A STOCKHOLDER, MUST PAY YOUR QUOTA OF SHORTAGE PAY BANK 1,000 AND FORFEIT YOUR LOWEST SECURITY BY PLACING SAME IN DECK OR UNDERNEATH CARDS — DISCARD WHEN PAID
- BANKRUPTCY — PAY BANK ALL YOUR CASH. You MAY SELL ANY OR ALL YOUR SECURITIES BY AUCTION TO HIGHEST BIDDER FOR CASH TO START DEEP AGAIN EXCEPTING MARRIAGE CARD — DISCARD WHEN PAID
- TAX DODGER — PAY TO HOLDER OF FEDERAL AUTHORITIES CARD ONE HALF YOUR CASH — DISCARD WHEN PAID

Fig. 3 UNLIQUIDATED ASSETS OR LIABILITIES

- LUCK — GOOD OR BAD? — BUY FROM PLAYER ON LEFT THE NEXT CARD HE DRAWS — PAYING 200 FOR IT — DISCARD WHEN PAID
- EXTRAVAGANCE — AS A RESULT, I AM FORCED TO SELL BY AUCTION TO HIGHEST BIDDER MY HIGHEST SECURITY OR ASSET — DISCARD WHEN GONE
- DRAW AGAIN — FOR THIS PRIVILEGE PAY BANK 100 PAY EACH PLAYER 100 — DISCARD WHEN PAID

INVENTOR.  
ROBERT W. REECE  
BY Stuart C. Barnes  
ATTORNEY.

Patented Nov. 11, 1924.

1,515,170

UNITED STATES PATENT OFFICE.

ROBERT W. REECE, OF PONTIAC, MICHIGAN, ASSIGNOR TO EVA M. REECE, OF PONTIAC, MICHIGAN.

CARD GAME.

Application filed November 2, 1921. Serial No. 512,169.

*To all whom it may concern:*

Be it known that I, ROBERT W. REECE, a citizen of the United States, residing at Pontiac, in the county of Oakland and State of Michigan, have invented certain new and useful Improvements in Card Games, of which the following is a specification.

This invention relates to a new game of cards. It has for its object a game of cards intended to be instructive in business affairs, teaching people who are unaccustomed to business matters some of the usual transactions in the business world, such as Federal taxes, bankruptcy, discounts, insurance, and other every-day transactions which are little appreciated by women and children in particular.

The main outline of the game may be stated in a few words. Each player starts with a given indicia of money. A bank is provided by the successive withdrawals from the various players' units in accordance with the requirements on the cards drawn from the pack. Each player draws from the pack in turn. Some of the cards require him to pay into the bank, others permit him to withdraw from the bank, but withdrawals from the bank in the end are considerably less than the payments into the bank. Consequently after the last card has been drawn there is a considerable number of units in the bank. The cards not only direct the payments and withdrawals from the bank but some of them stand as conditional assets to be held until the end of the game. The player having the largest total of conditional assets takes all the units in the bank. Of course, the player that acquires the largest increment of units during the game including the final disposition of the bank wins that particular hand, if we may so designate one complete distribution of the cards. Any number of cards can be used, preferably fifty-two are used.

Figure 1 or the first column of cards is a set of "Asset" cards.

Figure 2 or the second column of cards is a set of "Conditional asset" cards.

Figure 3 or the third column of cards is a set of cards that are "Unliquidated assets or liabilities."

Figure 4 or the fourth column of cards is a set of cards that are "Unliquidated liabilities."

Figure 5 or the fifth column of cards is a set of cards that are straight "Liabilities."

The cards, preferably fifty-two in number, are placed in the center of the table and each player draws in succession. In the drawings I have shown only the distinct classes and sub-classes of cards which form the types.

I shall refer to the card which is a representative of a sub-class as "the type." The number of any type of cards may, of course, be varied, as may also the printing, but they will have the same general characteristics of "the type."

As I have already explained, each player starts with a given number of units or counters representing dollars. The first player draws, we will say, a "Liability" card, such as shown in Figure 5—the first card, for instance—he has to pay into the bank at the center of the table the counters that represent $500.00. The card is discarded. The next player draws, we will say, the second card in Figure 2. He has a "Conditional asset," namely, for $15,000.00 worth of U. S. Rubber Stock—he has to pay the bank $500.00. We call this a "Conditional asset" because it is not an asset unless when the last drawing has taken place the holder's total assets reach the largest total of any player. He then takes the counters in the bank. We will say the third player then draws and he draws the second card in Figure 1—"Assets." This is "Accident insurance." This is a simple asset card collectible from the bank authorizing the holder to withdraw $1000.00 from the bank and discard the card.

Now that the general plan of the game is understood some of the peculiarities of the cards and transactions under the various classes may be enumerated. Beginning with Figure 1, card 1, the general class is "Assets." The sub-class is "Tax" collectible from the winner. The winner is always bound to pay the holder of this tax card $1000.00 in counters. The second card in Figure 1 is the sub-class "Asset collectible from bank." This has already been explained. The third card in Figure 1 belongs to the sub-class "Assets collectible from holder companion card and obligatio to bank." By reason of the judgment of the court, the holder collects $1000.00 from the player that either then holds or subsequently draws the companion card marked "Judgment—pay holder of companion card $1000.00." At the same time the card obligates the drawer to pay the bank $100.00. The fourth type under Figure 1 is "Assets collectible from other players." Each player presents the holder with $100.00 from his counters as demanded by the wording on the face of the card. He also draws from the bank $500.00.

Now passing to the Figure 2. This is headed "Conditional assets." As already explained, these are "Hold assets" and are called "Conditional assets" as a title for the general class because only in case the assets of the holder out-total all other players do they really become an asset. They then become an asset in the sense they entitle the player to take all that is left in the bank. The first card under this column is a "Straight hold asset," which will be readily understood. The second card is a "Conditional asset" with the further obligation to pay the bank a specified sum. The third card is a "Conditional and unconditional asset," which will be understood without further description. The fourth card is sort of a complex transaction that represents a "Hold asset" and obligation to pay the bank $300.00 at once, and it is also one of the cards that has a companion card which permits the holder of this card to collect from the holder of the companion card $400.00.

We may now pass to Figure 5 for the moment. The three cards there shown explain themselves. They are simple requirements to pay, card 1, the bank, card 2, each player, and card 3, the holder of the companion card various sums as specified in these cards.

Figure 3 represents a class of cards that I have designated "Unliquidated assets or liabilities." As each card is examined the reason for the class title will be understood. The first card of this class reads "Buy from player on left the next card he draws, paying for it $200.00." At the time this card 1 is drawn it will be apparent that the player does not know whether he is about to buy an asset or liability or the amount of it, consequently this card is in fact and in truth an "Unliquidated asset or liability." Card 2 of this class is rather peculiar. It is classified in this class because when the drawer takes it from the pack he is not aware whether the progress of the game will determine this card a final asset or a final liability, or the amount of it. For instance, the player may have a card such as the "Stock" card #2 in column 2 calling for $15,000.00 worth of U. S. Rubber. He puts this up for sale to somebody that pays $1000.00 for it. He gets $1000.00 in cash added to his counters. It will readily be understood that if he could not have won the bank even with the card sold then the card turns out to be an asset. On the other hand, if with this card he could have won the game and the bank is larger than the amount that he received for the card the same has been a liability which at the time the card was drawn was an unliquidated liability.

Taking up card 3 of Figure 3, this requires the player to pay each player $100.00 and the bank $100.00. For these payments he has the privilege of drawing again. It is obvious that only after the second draw is made can the holder of the card determine whether the card has been an asset or a liability or to what amount. Hence the card is properly classified as "An unliquidated asset or liability."

In Figure 4 I have collected the types which are properly classified as "Unliquidated liabilities." The first card defines a transaction which can be easily understood by reading the card. The second card of this class is a very unfortunate one to draw as one will see that he loses all his cash, consequently it is an unliquidated liability. Of course, it becomes liquidated at once where the amount of the holder's cash becomes determined. Type 3 of this general class is entitled "Taxes." This is the same type of card as the preceding card "Bankruptcy" except that the payee happens to be the holder of the companion card instead of the bank.

From the above description it will be apparent that these various classes and subclasses forming, as here shown, seventeen types of cards, forms a very instructive game, especially for those who are uninitiated in business transactions. Although the units adopted are those of money to truly simulate a business transaction, it is obvious that the game is in no way intended to be a gambling game and the units are so large only the most improvident would ever think of utilizing it for gambling.

What I claim is:

1. In a card game, a class of cards representing assets by wording and figures directing the holder to draw from a specified place which constitutes the bank, a second class of cards representing liabilities by wording and figures requiring the holder to pay to said bank, and a third class of cards representing by words and figures conditional assets which become real assets only in case in the final outcome of the game the total of these conditional assets is greater than that of any other player and thereby entitles the holder to take the bank.

2. In a card game, the combination of a class of cards representing by words and figures assets by directing the holder to draw from a specified place which constitutes the bank, a second class representing by words and figures liabilities by requiring the holder to pay to said bank, and a third class of cards representing by words and figures unliquidated liabilities by compelling the player to pay a sum undetermined by the card but capable of determination extraneous of the card under directions given on the card.

3. In a card game, the combination of a class of cards containing wording and figures representing assets by requiring the holder to draw from a specified fund, a second class of cards representing by words and figures liabilities by requiring the holder to pay to said specified fund, and a still further class of cards representing by words and figures unliquidated assets or liabilities, that is, requiring the player to perform a transaction therein directed by words and figures which may ultimately result in either loss or gain in a sum at the moment undeterminable.

4. In a card game, a class of cards representing assets, and another class of cards representing by words and figures unliquidated assets or liabilities, that is, requiring the player to perform the transaction thereon directed by words and figures which may ultimately result in either loss or gain in a sum at the moment undeterminable.

5. In a card game, a class of cards representing liabilities, and another class of cards representing by words and figures conditional assets which become real assets only when in the final outcome of the game the total addition of these assets is greater than any other player and thereby entitles the holder to take a certain specified fund.

In testimony whereof I affix my signature.

ROBERT W. REECE.